US008261543B2

(12) United States Patent
Nomura et al.

(10) Patent No.: US 8,261,543 B2
(45) Date of Patent: Sep. 11, 2012

(54) WORKING VEHICLE WITH HST

(75) Inventors: Hitoshi Nomura, Osaka (JP); Keiichi Hayashi, Osaka (JP); Hidehiro Yuki, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 641 days.

(21) Appl. No.: 12/523,925

(22) PCT Filed: Oct. 11, 2007

(86) PCT No.: PCT/JP2007/069818
§ 371 (c)(1),
(2), (4) Date: Jul. 21, 2009

(87) PCT Pub. No.: WO2008/090650
PCT Pub. Date: Jul. 31, 2008

(65) Prior Publication Data
US 2010/0043419 A1    Feb. 25, 2010

(30) Foreign Application Priority Data

Jan. 23, 2007  (JP) ................................. 2007-012655
Aug. 2, 2007   (JP) ................................. 2007-202063

(51) Int. Cl.
*F16D 39/00* (2006.01)
(52) U.S. Cl. ................ 60/328; 60/434; 60/448; 60/487; 60/435
(58) Field of Classification Search ............... 60/433, 60/434, 448, 487, 328, 436, 435
See application file for complete search history.

(56) References Cited

U.S. PATENT DOCUMENTS

| | | | | |
|---|---|---|---|---|
| 4,554,991 A * | 11/1985 | Eden | ............................ | 180/243 |
| 5,184,466 A * | 2/1993 | Schniederjan et al. | ......... | 60/448 |
| 5,508,916 A * | 4/1996 | Markyvech et al. | ............ | 701/51 |
| 7,686,737 B2 * | 3/2010 | Nishi et al. | .................... | 477/115 |

FOREIGN PATENT DOCUMENTS

| | | |
|---|---|---|
| JP | 63-163065 | 7/1988 |
| JP | 04-038757 | 2/1992 |
| JP | 2002-250438 | 6/2002 |
| JP | 2005-178446 | 7/2005 |

OTHER PUBLICATIONS

International Search Report for International Application No. PCT/JP2007/069818 dated Dec. 10, 2007, 2 pgs.

* cited by examiner

*Primary Examiner* — Allana Lewin
*Assistant Examiner* — Logan Kraft
(74) *Attorney, Agent, or Firm* — Sterne, Kessler, Goldstein & Fox P.L.L.C.

(57) ABSTRACT

A working vehicle with an HST in which over-rotation of a hydraulic pump in the HST or the pump input shaft thereof is prevented when a main clutch is disconnected during a run. When a main clutch connection/disconnection detection means detects the disconnection state of the main clutch during a run, a control means judges whether a vehicle speed detected by a vehicle speed detection means is at least a set speed or not, and if the vehicle speed is at least the set speed, the movable swash plate of the hydraulic pump in an HST is controlled to sustain it at the current inclination angle.

9 Claims, 8 Drawing Sheets

WORKING VEHICLE WITH HST

TECHNICAL FIELD

The present invention relates to a working vehicle with an HST, that is, hydraulic stepless transmission. In more detail, the present invention relates to control of a movable swash plate of a hydraulic pump of the HST when a main clutch is disconnected at the time of running.

BACKGROUND ART

Conventionally, with regard to an HST having a hydraulic pump and a hydraulic motor, there is well known an art in which a movable swash plate of the hydraulic pump or the hydraulic motor of variable capacity type is rotatively controlled by a hydraulic servo mechanism so as to adjust the capacity of the hydraulic pump or the hydraulic motor. As the hydraulic servo mechanism, there is known an automotive mechanism in which the movable swash plate is rotated automatically in proportion to the increase of rotation speed of the hydraulic pump by an electromagnetic valve attached to the hydraulic pump or the body of the HST and a manual servo mechanism in which the movable swash plate of the hydraulic pump is operated by a main shift lever attached to the outside of the body of the HST.

With regard to the manual servo mechanism, there is known construction in which the discharge amount of the hydraulic pump and the suction amount of the hydraulic motor are changed by rotating the main shift lever so as to perform the main speed change by changing the output rotation speed, and forward/rearward traveling is switched by operating the main shift lever oppositely from the neutral position. There is also known construction of control by rotating a forward/rearward running switch lever disposed near a steering wheel so as to improve operability in the case that the continuous forward/rearward running switching is required.

With regard to the control of the movable swash plate of the HST having such a hydraulic servo mechanism, for example, the control of the movable swash plate of the HST is disclosed in Patent Literature 1. In this control, when the forward/rearward running switch lever is operated to the rearward running side at the state in which the HST is shifted to the high speed position by operating the main shift lever, the movable swash plate of the hydraulic pump is rotated to the neutral position so as to prevent reward rearward start at high speed, thereby improving the safety.

Patent Literature 1: the Japanese Patent Laid Open Gazette 2002-250438

DISCLOSURE OF INVENTION

Problems to be Solved by the Invention

With regard to a vehicle having the HST of Patent Literature 1, when a main clutch is disconnected for reduction or the like at the time of running so as to block power transmission from an engine to the HST, the movable swash plate of the hydraulic pump is rotated to the neutral position. However, at the time of high speed running, when the main clutch is disconnected and the movable swash plate of the hydraulic pump is rotated and slanted so that the slant angle thereof is small near the neutral position, the rotational driving force from a wheel is transmitted to the hydraulic motor, and the hydraulic motor is actuated as a pump and the hydraulic pump is actuated as a motor, whereby the overspeed of the hydraulic pump, an input shaft thereof or a clutch disc of the main clutch may occur so as to damage these members or members near them.

Furthermore, when the vehicle speed cannot be detected because of obstacle of a vehicle speed detection means or the like, whether the vehicle speed is high or not cannot be judged. Accordingly, the main clutch may be disconnected at the time of the high speed running so as to cause the overspeed of the hydraulic pump or the like. As a means for preventing such a situation, there is known a means which stops the vehicle compulsorily when the vehicle speed cannot be detected because of the obstacle of the vehicle speed detection means or the like. However, when the vehicle is stopped compulsorily on the field, a footing for an operator cannot be secured and moving work such as tillage cannot be continued, whereby it is not convenient for the operator.

Then, the purpose of the invention is to provide the construction that when the main clutch is disconnected at the time of running at speed higher than set speed, the movable swash plate of the hydraulic pump is controlled so as to prevent the overspeed, and when the vehicle speed cannot be detected because of the obstacle of the vehicle speed detection means or the like, the movable swash plate of the hydraulic pump is controlled so as to enable the vehicle to run while preventing the overspeed.

Means for Solving the Problems

With regard to a working vehicle with an HST according to the present invention, which has an HST having a hydraulic pump and a hydraulic motor, comprising: a main clutch disposed between the HST and an engine; a power transmission means disposed between the HST and a wheel; an actuator changing slant angle of a movable swash plate of the hydraulic pump of the HST; and a control means controlling actuation of the actuator, wherein a main clutch connection/disconnection detection means detecting connection status of the main clutch and a vehicle speed detection means detecting vehicle speed are provided, each of the detection means is connected to the control means, and when vehicle speed is not less than the set speed at the time of disconnecting the main clutch, the slant angle of the movable swash plate of the hydraulic pump is held at the angle at which the main clutch is disconnected.

With regard to the working vehicle with the HST according to the present invention, when vehicle speed is less than set speed while the main clutch is disconnected, the movable swash plate of the hydraulic pump is rotated to the neutral position.

With regard to the working vehicle with the HST according to the present invention, when the vehicle speed detection means does not detect the vehicle speed, the slant angle of the movable swash plate of the hydraulic pump is controlled so that the vehicle speed is smaller than the set speed.

With regard to the working vehicle with the HST according to the present invention, a sub transmission is provided in the power transmission means, and in the case that the vehicle speed detection means does not detect vehicle speed, when the sub transmission is at the low speed position, slant angle of the movable swash plate of the hydraulic pump can be changed suitably.

With regard to the working vehicle with the HST according to the present invention, the vehicle speed detection means comprises a rotation detection means, which outputs a pulse signal corresponding to rotation of a drive shaft of the wheel, and a conversion means, which outputs voltage corresponding to frequency of the pulse signal of the rotation detection means.

With regard to the working vehicle with the HST according to the present invention, there is provided a warning means which warns when vehicle speed is not detected by the vehicle speed detection means.

Effect of the Invention

With regard to a working vehicle with an HST according to the present invention, which has an HST having a hydraulic pump and a hydraulic motor, comprising: a main clutch disposed between the HST and an engine; a power transmission means disposed between the HST and a wheel; an actuator changing slant angle of a movable swash plate of the hydraulic pump of the HST; and a control means controlling actuation of the actuator, wherein a main clutch connection/disconnection detection means detecting connection status of the main clutch and a vehicle speed detection means detecting vehicle speed are provided, each of the detection means is connected to the control means, and when the vehicle speed is not less than the set speed at the time of disconnecting the main clutch, the slant angle of the movable swash plate of the hydraulic pump is held at the angle at which the main clutch is disconnected.

Accordingly, when the main clutch is disconnected at the time of running for the reduction or the like, the overspeed of the hydraulic pump, an input shaft thereof or a clutch disc of the main clutch is prevented. Then, these members or members near them are prevented from being damaged so that the safety is secured and the durability of the HST is improved. Even if the main clutch is switched from the disconnection state to the connection state, the movable swash plate of the hydraulic pump is not at the neutral position, whereby the sudden braking is prevented.

With regard to the working vehicle with the HST according to the present invention, when the vehicle speed is less than set speed while the main clutch is disconnected, the movable swash plate of the hydraulic pump is rotated to the neutral position. Accordingly, when the vehicle speed is not more than set speed, the movable swash plate of the hydraulic pump can be returned to the neutral position without causing the overspeed of the movable swash plate of the hydraulic pump, the pump input shaft, and furthermore the clutch disc of the main clutch. Therefore, the sudden start at the time of connecting the main clutch is prevented.

With regard to the working vehicle with the HST according to the present invention, when the vehicle speed detection means does not detect the vehicle speed, the slant angle of the movable swash plate of the hydraulic pump is controlled so that the vehicle speed is smaller than the set speed. Accordingly, the vehicle speed is limited to be smaller than the set speed. Even if the vehicle speed is not detected because of the obstacle of the vehicle speed detection means or the like, the overspeed of the hydraulic pump, the pump input shaft thereof, and furthermore the clutch disc of the main clutch is certainly prevented. Moreover, even if the vehicle is stopped compulsorily in the field, a footing for an operator can be secured and moving work such as tillage can be continued.

With regard to the working vehicle with the HST according to the present invention, a sub transmission is provided in the power transmission means, and in the case that the vehicle speed detection means does not detect vehicle speed, when the sub transmission is at the low speed position, slant angle of the movable swash plate of the hydraulic pump can be changed suitably. Accordingly, the running at the vehicle speed lower than the set speed can be performed while the speed change is performed with the HST, whereby the running or work can be continued.

With regard to the working vehicle with the HST according to the present invention, the vehicle speed detection means comprises a rotation detection means, which outputs a pulse signal corresponding to rotation of a drive shaft of the wheel, and a conversion means, which outputs voltage corresponding to frequency of the pulse signal of the rotation detection means. Accordingly, compared with the case that the vehicle speed detection means only has the rotation detection means, the obstacle or extraordinariness of the vehicle speed detection means can be detected easily.

With regard to the working vehicle with the HST according to the present invention, there is provided a warning means which warns when the vehicle speed is not detected by the vehicle speed detection means. Accordingly, an operator's attention is called to the obstacle or extraordinariness of the vehicle speed detection means so as to recognize the limit of the vehicle speed.

Figure 1:
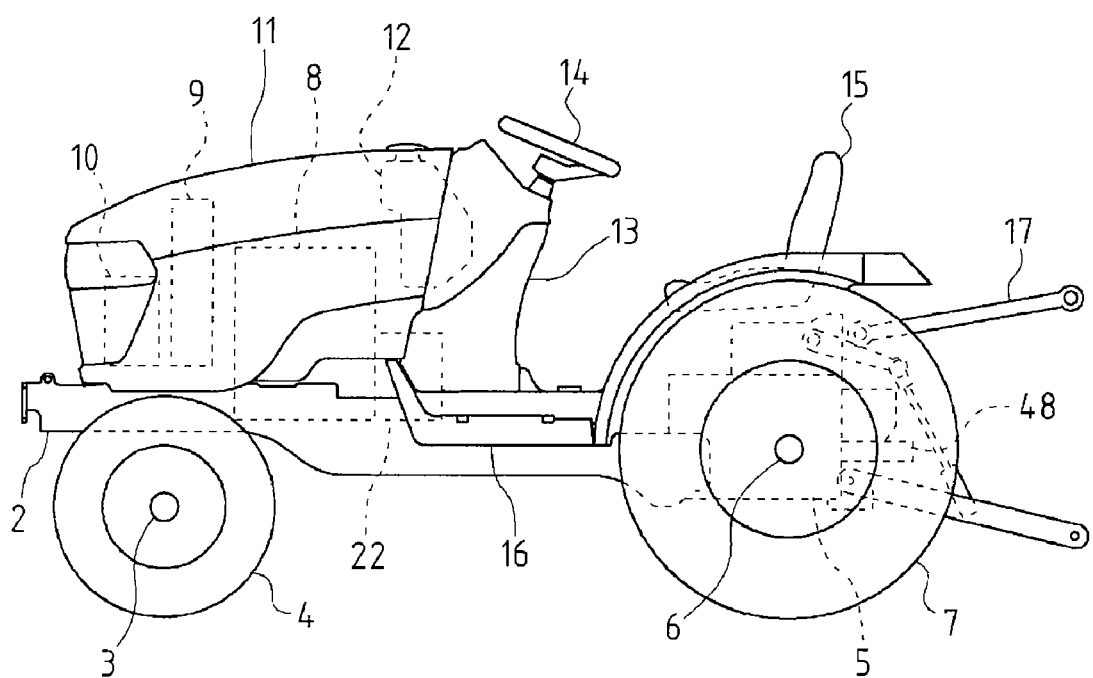
FIG. 1 It is a side view of schematic construction of a working vehicle with an HST according to an embodiment of the present invention.

DESCRIPTION OF NOTATIONS 8 an engine
22 a main clutch
23 a pump input shaft
50 an HST (hydraulic stepless transmission)
50a an HST housing
51 a hydraulic pump
52 a hydraulic motor
54 a motor output shaft
55 a movable swash plate
56 a hydraulic cylinder (an actuator)
80 a sub transmission
110 a control means
111 an engine rotation speed detection means
112 a main clutch connection/disconnection detection means
113 a slant angle detection means
116 a vehicle speed detection means
116a a rotation detection means
116b a F/V conversion means
117 a setting means
118 an electromagnetic valve
119 a warning means

THE BEST MODE FOR CARRYING OUT THE INVENTION

Explanation will be given on schematic construction of a tractor as a working vehicle with an HST (hydraulic stepless transmission) according to an embodiment of the present invention.

With regard to the working vehicle, as shown in FIG. 1, a front axle casing is rockably disposed in a lower front portion of a body frame 2, and front wheels 4 are attached to left and right ends of a front axle 3 pivotally supported by the front axle casing. A transmission 5 is fixed to a rear portion of the body frame 2. Rear axle casings are respectively disposed on left and right side surfaces of a rear portion of the transmission 5. A rear wheel 7 is attached to an end of a rear axle 6 pivotally supported by each of the rear axle casings.

An engine 8 is mounted on a longitudinal middle portion of the body frame 2. A radiator 9 and a battery 10 are arranged before the engine 8 and a fuel tank 12 is arranged behind the engine 8. The engine 8, the radiator 9, the battery 10 and the fuel tank 12 are covered by a bonnet 11. A dashboard 13 is disposed behind the bonnet 11.

A steering wheel 14 is disposed behind and above the dashboard 13 and is supported by a wheel column arranged in the dashboard 13 with a wheel shaft. A seat 15 is provided behind the steering wheel 14, and a step 16 is disposed below the position between the seat 15 and the dashboard 13. In addition to the steering wheel 14, operation means of each part such as a main shift lever, a sub shift lever and a clutch pedal are disposed around the seat 15 so as to constitute an operation part.

A main clutch 22 is provided behind the engine 8, and the transmission 5 is disposed behind the main clutch 22. Accordingly, when the main clutch 22 is engaged, the power of the engine 8 is changed in speed by the transmission 5 and then transmitted to the rear wheels 7 and can be transmitted to the front wheels 4.

The power of the engine 8 can also be transmitted to a PTO shaft 48 projected from a rear end of the transmission 5. The power transmitted to the PTO shaft 48 is transmitted through universal joints and transmission shafts to a working machine 49 mounted to a working machine mounting device 17 at a rear end of the vehicle.

Next, an explanation will be given on a power transmission mechanism of the working vehicle.

Figure 2:
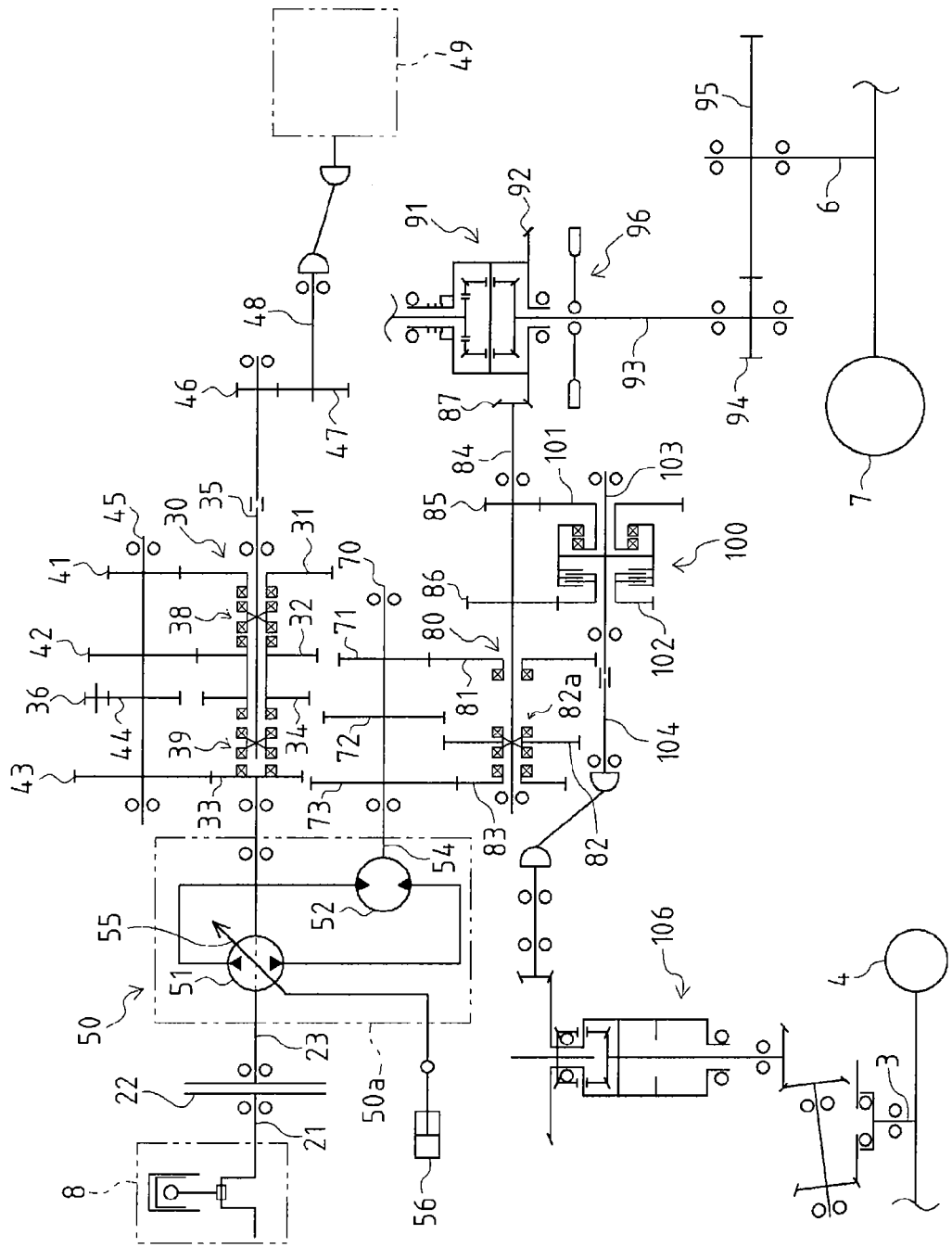
FIG. 2 It is a skeleton drawing of power transmission construction of the working vehicle.
Figure 3:
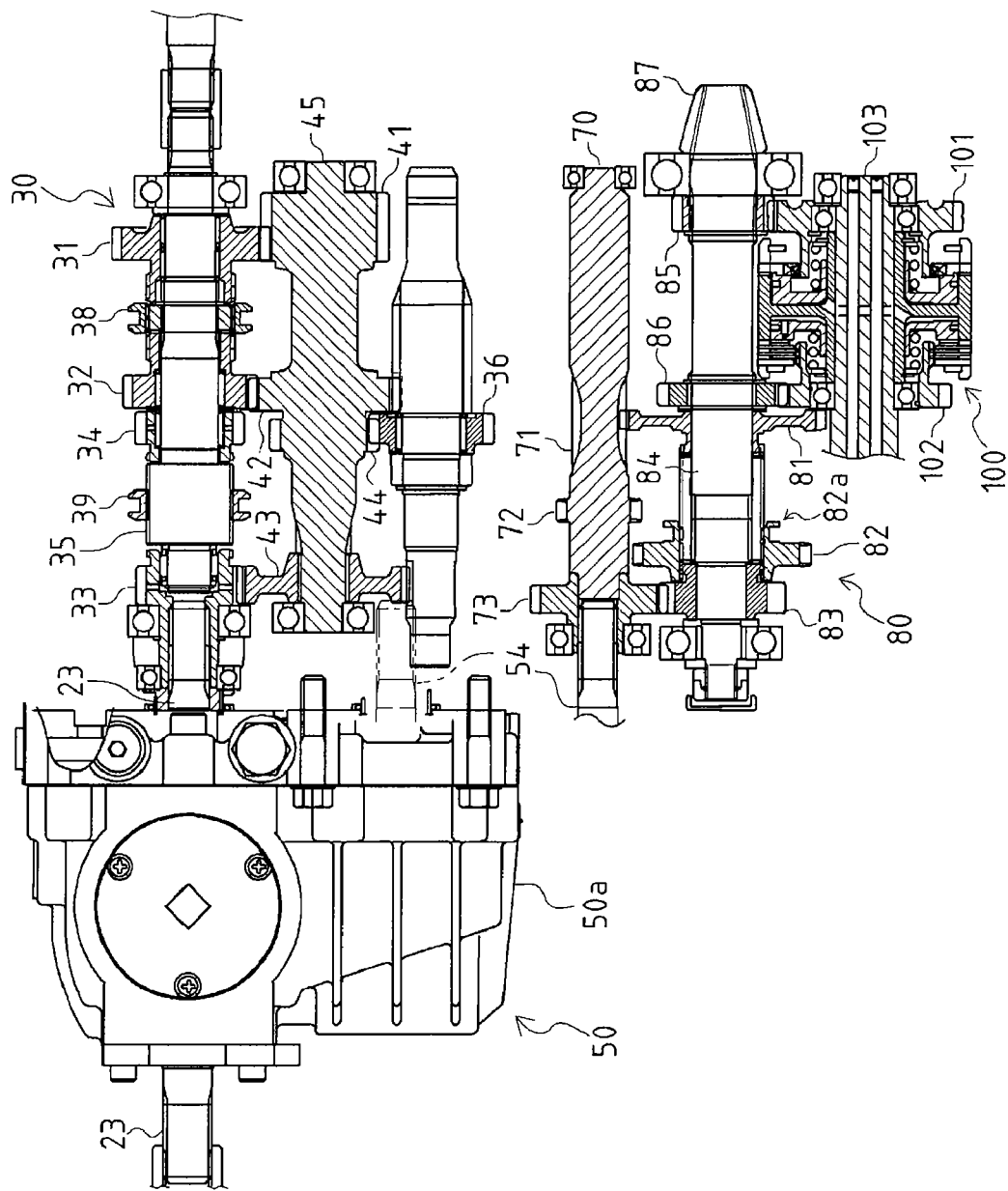
FIG. 3 It is a side view partially in section of the power transmission construction from the HST to a main transmission mechanism and a sub transmission mechanism.

As shown in FIGS. 2 and 3, an output shaft 21 is extended rearward from the engine 8 and is connected through the main clutch 22 to a pump input shaft 23 of a hydraulic pump 51 of an HST (hydraulic stepless transmission) 50 as a main transmission. The main clutch 22 is interlockingly connected through a suitable link mechanism to the clutch pedal disposed in the operation part so as to be connected and disconnected by operating the pedal.

The HST 50 is constructed by disposing the hydraulic pump 51 of variable capacity type and a hydraulic motor 52 of fixed capacity type inside an HST housing 50a. With regard to the HST 50, the hydraulic pump 51 is actuated by the power inputted from the pump input shaft 23, and a movable swash plate 55 is rotated and slanted by expansion and contraction of a hydraulic cylinder 56 as an actuator, whereby discharge direction and discharge amount of pressure oil is changed based on the slant angle.

The pressure oil discharged from the hydraulic pump 51 actuates the hydraulic motor 52 based on the discharge direction and discharge amount, whereby output rotation of a motor output shaft 54 is changed. Namely, the main speed change ratio of the HST 50 is changed based on the slant angle of the movable swash plate 55 of the hydraulic pump 51.

The hydraulic cylinder 56, which changes the slant angle of the movable swash plate 55 provided in the hydraulic pump 51, is controlled through a control means 110 by operating the main shift lever disposed in the operation part or later-discussed control. The actuator is not limited to the hydraulic cylinder and may alternatively be constructed by an electric motor or a solenoid.

From the HST, the pump input shaft 23 is extended rearward while penetrating the hydraulic pump 51, and the motor output shaft 54 of the hydraulic motor 52 is extended rearward. A PTO clutch shaft 35 is extendingly provided longitudinally behind the pump input shaft 23 so as to be positioned concentrically with the pump input shaft 23.

A transmission gear 33 is fixed on a rear end of the pump input shaft 23. A PTO first gear 31, a PTO second gear 32 and a PTO reverse gear 34 are freely fitted on the PTO clutch shaft 35. On an intermediate shaft 45 disposed parallel to the PTO clutch shaft 35, a transmission gear 43 is fixed, and transmission gears 41, 42 and 44 are fixed or formed.

The transmission gear 33 on the pump input shaft 23 is meshed with the transmission gear 43 on the intermediate shaft 45. The PTO first gear 31 and the PTO second gear 32 on the PTO clutch shaft 35 are respectively meshed with the transmission gears 41 and 42 on the intermediate shaft 45. The PTO reverse gear 34 on the PTO clutch shaft 35 is meshed with the transmission gear 44 through a counter gear 36.

On the PTO clutch shaft 35, a slider 38 is spline-fitted between the PTO first gear 31 and the PTO second gear 32 so as to be slidable along the axial direction, and a slider 39 is spline-fitted between the PTO reverse gear 34 and the transmission gear 33 so as to be slidable along the axial direction. The sliders 38 and 39 are interlockingly connected through a suitable link mechanism to a PTO shift lever disposed in the operation part.

Each of the PTO first gear 31, the PTO second gear 32, the PTO reverse gear 34 and the transmission gear 33 is formed therein with a spline part which can be spline-engaged with the sliders 38 and 39. By operating the PTO shift lever, the sliders 38 and 39 are slid along the axial direction so as to be spline-engaged with the spline part of one of the PTO first gear 31, the PTO second gear 32, the PTO reverse gear 34 and the transmission gear 33.

Accordingly, PTO transmission 30 is constructed. The power of the pump input shaft 23 is enabled or disabled from being transmitted to the PTO clutch shaft 35. Otherwise, the power is outputted to one of the PTO first gear 31, the PTO second gear 32, the PTO reverse gear 34 and the transmission gear 33, changed in speed, and then enabled to be transmitted to the PTO clutch shaft 35.

A transmission gear 46 is fixed at the rear end of the PTO clutch shaft 35 and is meshed with a transmission gear 47 fixed at the front end of the PTO shaft 48. The PTO shaft 48 is projected rearward from the transmission 5 and connected through universal joints and transmission shafts to the working machine 49 attached to the rear end of the vehicle so as to transmit the power to the working machine 49.

A power transmission means, which transmits the power from the HST 50 to the front and rear wheels 4 and 7, is mounted with a sub transmission 80 behind the motor output shaft 54 of the hydraulic motor 52 extended rearward from the HST 50. Namely, a transmission shaft 70 is extendingly longitudinally provided and so as to be arranged concentrically with the motor output shaft 54 and connected interlockingly to the motor output shaft 54.

A sub speed change shaft 84 is arranged parallel to the transmission shaft 70. Transmission gears 71, 72 and 73 are formed or fixed on the transmission shaft 70. A sub first gear 81, a sub second gear 82 and a sub third gear 83 are freely fitted on the sub speed change shaft 84.

The sub first gear 81 and the sub third gear 83 on the sub speed change shaft 84 are respectively meshed with the transmission gears 71 and 73 on the transmission shaft 70. The sub second gear 82 on the sub speed change shaft 84 is meshed with the transmission gear 72 on the transmission shaft 70.

A sub speed change shifter 82a is spline-fitted on the sub speed change shaft 84 between the sub first gear 81 and the sub third gear 83 so as to be slidable along the axial direction. The sub speed change shifter 82a is constructed integrally with the sub second gear 82 and connected interlockingly through a suitable link mechanism to the sub shift lever disposed in the operation part.

A spline part is formed in each of the sub first gear 81 and the sub third gear 83, and a spline part which can be spline-engaged with the spline part of the sub first gear 81 or the sub third gear 83 is formed in the sub speed change shifter 82a. By operating the sub shift lever, the spline part of the sub first gear 81 or the sub third gear 83 formed in the sub speed change shifter 82a is slid along the axial direction so that the spline part thereof is spline-engaged with the spline part of the sub first gear 81 or the sub third gear 83, or the sub second gear 82 is meshed with the transmission gear 72.

Accordingly, the sub transmission 80 is constructed, and power of the transmission shaft 70 is outputted to one of the gears 81, 82 and 83 on the sub speed change shaft 84 and changed in speed and then transmitted to the sub speed change shaft 84. Namely, in this embodiment, the sub transmission 80 is set to a low speed position with the sub first gear 81, set to a low speed position with the sub second gear 82 and set to a high speed position with the sub third gear 83 so as to realize three-stage speed change.

Furthermore, transmission gears 85, 86 and 87 are fixed on the sub speed change shaft 84. Among the transmission gears 85, 86 and 87, the transmission gear 87 arranged at a rear end of the sub speed change shaft 84 is meshed with a transmission gear 92 of a differential 91 at the side of the rear wheels 7.

An output shaft 93 of the differential 91 is interlockingly connected to the rear axle 6 through transmission gears 94 and 95. Accordingly, the power of the sub speed change shaft 84 is inputted into the differential 91 and then outputted from the output shaft 93 of the differential 91 so as to drive the rear wheel 7 on the rear axle 6. A brake device 96 is provided on the output shaft 93 and is interlockingly connected through a suitable link mechanism to a brake pedal disposed in the operation part.

Among the transmission gears 85, 86 and 87, the transmission gears 85 and 86 are respectively meshed with transmission gears 101 and 102 freely fitted on a front wheel driving output shaft 103. Accordingly, a four wheel drive/front wheel overdrive switching mechanism 100 inputs the power of the sub speed change shaft 84 into the front wheel driving output shaft 103 through one of the transmission gears 101 and 102.

The power transmitted to the front wheel driving output shaft 103 is transmitted through a front wheel transmission shaft 104, universal joints and the like to a differential 106 at the side of the front wheels and then outputted from an output shaft of the differential 106 so as to drive the front wheels 4 on the front axle 3.

Next, an explanation will be given on the principal part of the embodiment.

Figure 4:
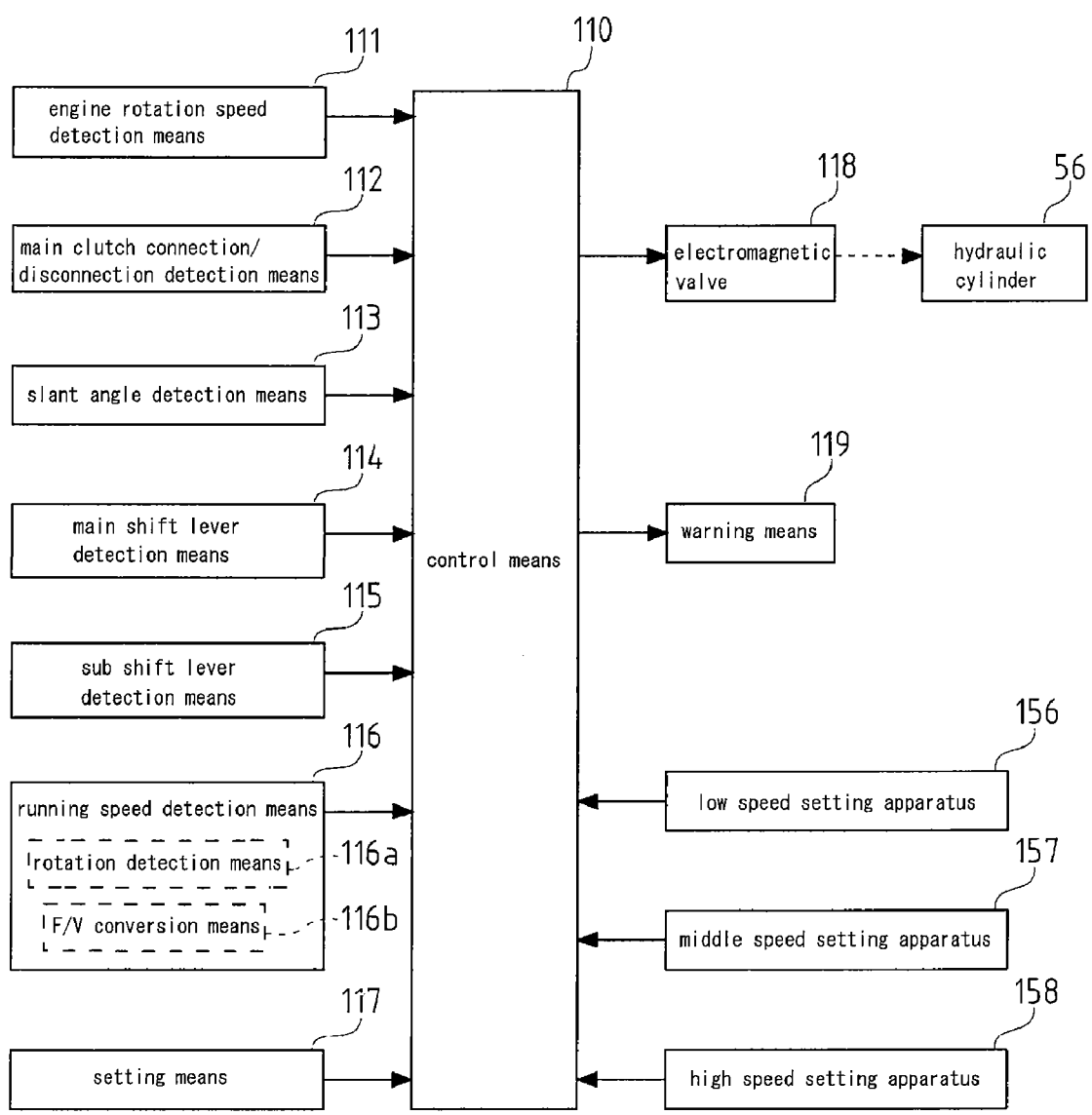
FIG. 4 It is a block diagram of control construction.

As shown in FIG. 4, the working vehicle has an engine rotation speed detection means 111 disposed near the output shaft 21 of the engine 8 so as to detect the output rotation speed, a main clutch connection/disconnection detection means 112 disposed near the clutch pedal or the main clutch 22 so as to detect the connection status of the main clutch 22, a slant angle detection means 113 detecting the slant angle of the movable swash plate 55 provided in the hydraulic pump 51, a main shift lever detection means 114 detecting the operation position of the main shift lever, that is, the speed change position of the HST 50, a sub shift lever detection means 115 detecting the operation position of the sub shift lever, that is, the speed change position of the sub transmission 80, a vehicle speed detection means 116 detecting the vehicle speed, and a setting means 117 setting set speed concerning later-discussed control. Each of these means is connected to the control means 110. The control means 110 has a ROM storing a control program and a RAM storing various data.

For example, the slant angle detection means 113 detects rotation angle of a trunnion shaft, which acts as a rotation axis of the movable swash plate 55 provided in the hydraulic pump 51 of the HST 50, with a potentiometer or a rotary encoder so as to detect the slant angle of the movable swash plate 55.

The vehicle speed detection means 116 is arranged near the position between the rear wheel 7 and the sub transmission 80 of the power transmission means, and has a rotation detection means 116a, which outputs a pulse signal corresponding to the rotation of the sub speed change shaft 84 serving as a drive shaft of the rear wheel 7, and a F/V conversion means 116b, which outputs voltage to the control means 110 corresponding to the frequency of the pulse signal of the rotation detection means 116a. The driving shaft of the rear wheel 7 may alternatively be the rear axle 6 interposed between the rear wheel 7 and the sub transmission 80 or the output shaft 93 of the differential 91.

With regard to the control means 110, for example, with regard to the voltage outputted by the F/V conversion means 116b of the vehicle speed detection means 116, the voltage of 0.3V is detected when the vehicle speed is zero (at the stopping state), and the voltage of 0.47V is detected when the vehicle speed is the maximum. Accordingly, voltage within the predetermined range larger than 0V and smaller than the power supply voltage (0.3V to 0.47V) is detected normally. However, when a harness connecting the control means 110 to the F/V conversion means 116b is broken, the power supply (impressed) voltage (5V) is detected as the voltage outputted by the F/V conversion means 116b. When the harness is short-circuited, 0V is detected as the voltage outputted by the F/V conversion means 116b. Therefore, when a fault of the vehicle speed detection means 116 occurs, whether the harness is broken or short-circuited can be judged with certainty.

The working vehicle is provided therein with an electromagnetic valve 118, which is connected to the hydraulic cylinder 56 rotating the movable swash plate 55, and a warning means 119 warning by turning on, or on and off, a lamp. The electromagnetic valve 118 and the warning means 119 are connected to the control means 110. Accordingly, when the vehicle speed detection means 116 cannot detect vehicle speed, the warning means 119 notices that the vehicle speed detection means 116 does not function. The warning means 119 is preferably arranged at the position which is visible from the seat 15. The warning means 119 may generate warning sound.

The electromagnetic valve 118 is switched by a control signal from the control means 110 so as to make the hydraulic cylinder 56 expand or contract. By the expansion and contraction of the hydraulic cylinder 56, the movable swash plate 55 of the hydraulic pump 51 is rotated so that the slant angle thereof is changed and is detected by the slant angle detection means 113, thereby being controlled to be set angle.

With regard to the working vehicle constructed as mentioned above, as a method of reduction at the time of forward or rearward running, there is a method wherein the main shift lever is operated to the reduction side so as to rotate the movable swash plate 55 of the hydraulic pump 51 of the HST 50 to the neutral position, a method wherein the brake pedal is treaded so as to actuate the brake device 96, a method wherein the clutch pedal is treaded and the main clutch 22 is disconnected so as to rotate the movable swash plate 55 of the hydraulic pump 51 of the HST 50 from the slant angle of running to the neutral position, and the like.

With regard to the operation wherein the main shift lever is rotated to the reduction side so as to rotate the movable swash plate 55 of the hydraulic pump 51 of the HST 50 to the neutral position or wherein the brake pedal is treaded so as to actuate the brake device 96, the movable swash plate 55 of the hydraulic pump 51 is compulsorily rotated to the neutral position while the main clutch 22 has been connected, whereby later-discussed overspeed of the pump input shaft 23 and the hydraulic pump 51 does not occur.

The reduction at the time of forward or rearward running may be performed by the method wherein the clutch pedal is treaded and the main clutch 22 is disconnected so as to rotate the movable swash plate 55 of the hydraulic pump 51 of the HST 50 from the slant angle of running to the neutral position. In this operation, the pump input shaft 23 of the hydraulic pump 51 is disconnected from the output shaft 21 of the engine 8 so as to be rotatable while the main clutch 22 has been disconnected. Accordingly, rotational driving force from the rear wheel 7 is transmitted to the motor output shaft 54 of the hydraulic motor 52 so that the hydraulic motor 52 is actuated as a hydraulic pump and the hydraulic pump 51 is actuated as a hydraulic motor, whereby the pump input shaft 23 is rotated.

In this case, rotation speed of the pump input shaft 23 is determined by rotation speed of the rear wheel 7 and slant angle of the movable swash plate 55 of the hydraulic pump 51 and is increased corresponding to rotation of the movable swash plate 55 toward the neutral position. Accordingly, a problem does not exist at the time of low speed running. However, at the time of high speed running, the oil amount sent from the hydraulic motor 52 to the hydraulic pump 51 is increased so that rotation speed of the pump input shaft 23 becomes very high when the movable swash plate 55 is rotated until the slant angle thereof is small and near the neutral position, whereby the overspeed of the pump input shaft 23 and the hydraulic pump 51 may occur.

Then, in the case that the reduction is performed by disconnecting the main clutch 22 at the time of forward or rearward running while the vehicle speed detection means 116 is actuated normally, a control flow discussed below is performed so as to prevent overspeed of the pump input shaft 23 and the hydraulic pump 51. Hereinafter, when the sub transmission 80 is at the low speed position or the middle speed position, the shift position is referred to as the low speed position.

Figure 5:
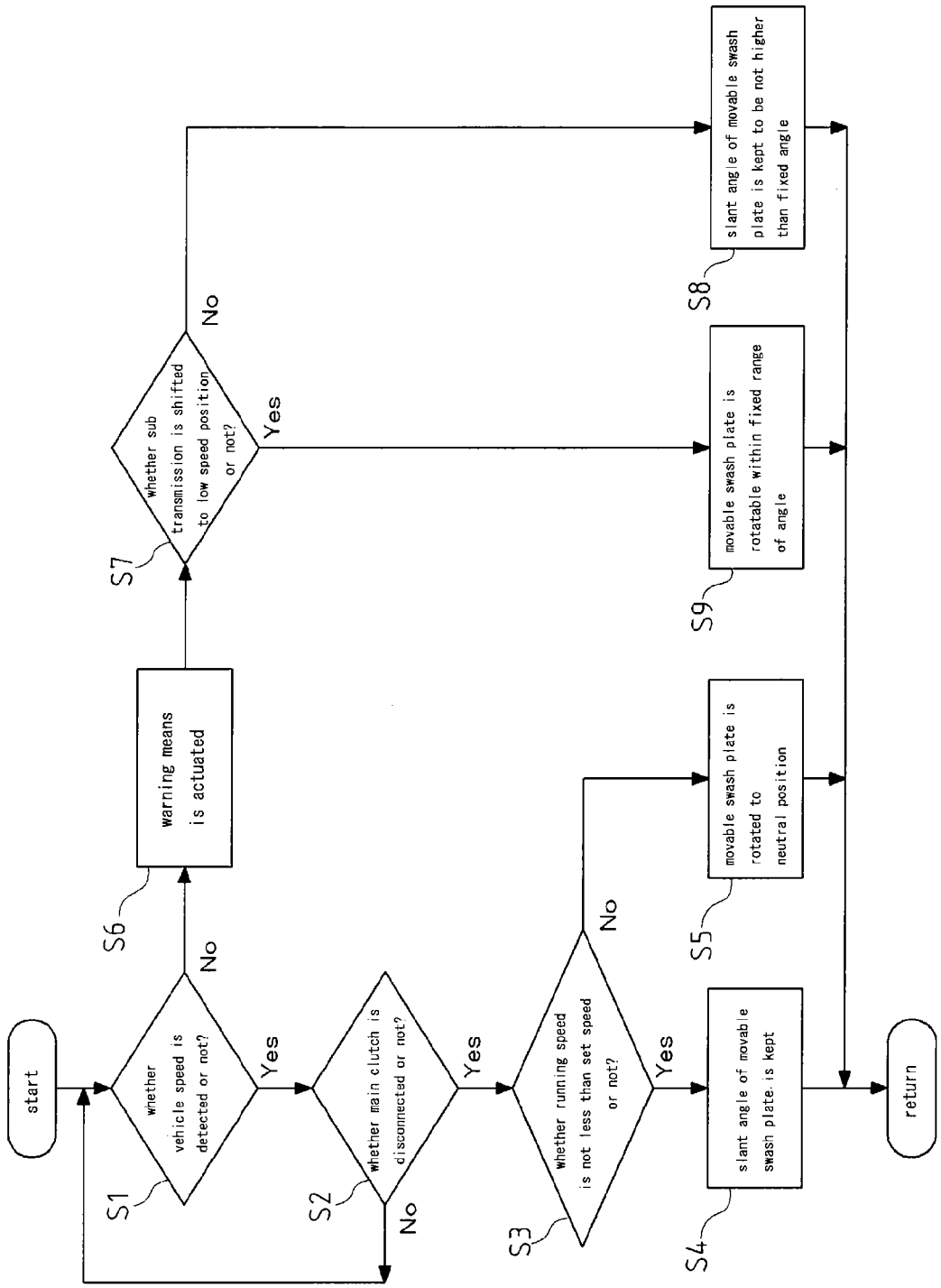
FIG. 5 It is a flow chart of a control method.

As shown in FIG. 5, at the time of forward or rearward running, when the vehicle speed is detected by the vehicle speed detection means 116 (step S1), the connection status of the main clutch 22 is judged (step S2). When the clutch pedal is treaded and the main clutch 22 is disconnected for reduction, the main clutch connection/disconnection detection means 112 detects the disconnection of the main clutch 22, and subsequently the control means 110 judges whether or not the vehicle speed is not lower than the set speed set previously by the setting means 117 (step S3).

At the set speed, the overspeed of the pump input shaft 23 may occur when slant angle of the movable swash plate 55 is reduced and the hydraulic motor 52 is actuated from the side of the rear wheel 7.

When the vehicle speed is judged not to be lower than the set speed, the control means 110 transmits a control signal to the electromagnetic valve 118, and the actuation of the hydraulic cylinder 56 is controlled so that the movable swash plate 55 of the hydraulic pump 51 of the HST 50 is not rotated toward the neutral side and the slant angle thereof is maintained at the angle at which the main clutch 22 is disconnected (step S4). Namely, the movable swash plate 55 is controlled not to be rotated to the neutral position so as to suppress rotation speed of the pump input shaft 23, thereby preventing overspeed of the pump input shaft 23, the hydraulic pump 51 and a clutch disc of the main clutch 22.

The vehicle speed is further reduced in the process in which the steps S1 to S4 are repeated. When the vehicle speed is judged to be smaller than the set speed at the step S3, the rotation speed of the pump input shaft 23 rotated by the rear wheel 7 is not so large that the hydraulic pump 51 or the like is damaged. Then, the control means 110 transmits a control signal to the electromagnetic valve 118 and actuation of the hydraulic cylinder 56 is controlled so that the movable swash plate 55 of the hydraulic pump 51 is rotated to the neutral position (step S5). Accordingly, the tread of the clutch pedal is released, thereby preventing the sudden start at the time of connecting the main clutch 22.

At the time of forward or rearward running, when the vehicle speed is not detected by the vehicle speed detection means 116, the warning means 119 warns and the maximum speed is limited so as to prevent the overspeed. In this case, the working vehicle is not stopped compulsorily and can keep on running.

When the vehicle speed detection means 116 is broken or a fault occurs in the connection between the vehicle speed detection means 116 and the control means 110 so that the actual vehicle speed is not detected, the control means 110 actuates the warning means 119 (step S6) so as to warn by turning on, or on and off, the lamp or the like.

Then, the sub shift lever detection means 115 detects the operation position of the sub transmission 80, and the control means 110 judges whether the sub transmission 80 is at the low speed position or not (step S7).

In the case that the sub transmission 80 is not at the low speed position but at the high speed position, when the speed change position of the HST 50, that is, slant angle of the movable swash plate 55 of the hydraulic pump 51, is changed by operating the main shift lever, the vehicle speed can be increased to be not less than the set speed. Therefore the control means 110 transmits a control signal to the electromagnetic valve 118 and actuation of the hydraulic cylinder 56 is controlled. By the control of the actuation of the hydraulic cylinder 56, the movable swash plate 55 of the hydraulic pump 51 is rotated so that the slant angle thereof is held to be not more than a predetermined angle at which the traveling speed becomes less than the set speed (step S8).

Figure 6:
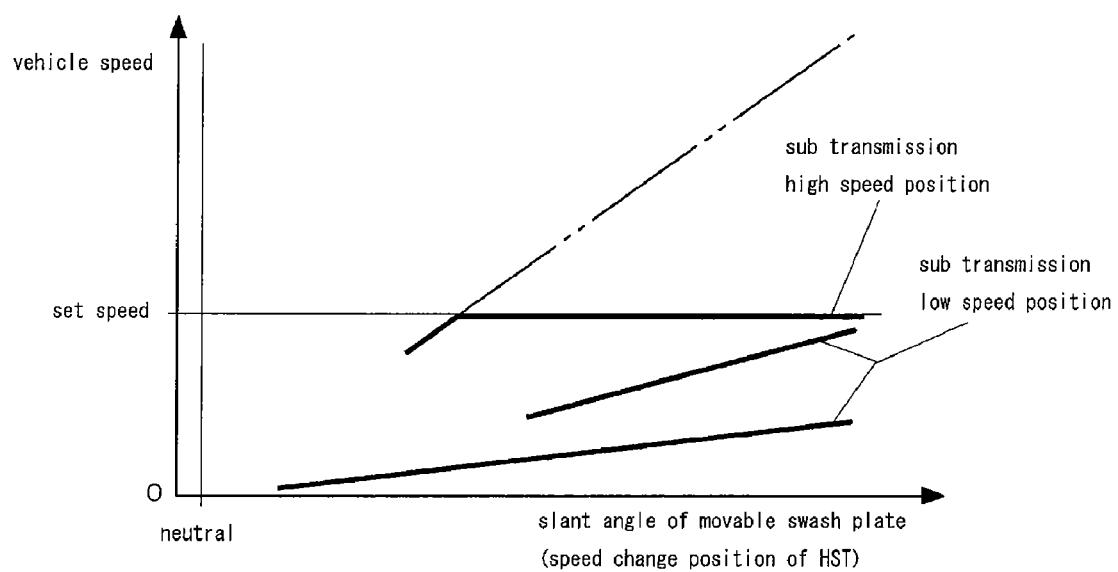
FIG. 6 It is a diagram of relation between slant angle of a movable swash plate at each speed change position of the HST and vehicle speed.

Accordingly, as shown in FIG. 6, when the high speed position is selected, the maximum speed is limited so as to be smaller than the set speed regardless of operation of the main shift lever, whereby the overspeed of the pump input shaft 23 and the hydraulic pump 51 is certainly prevented when the main clutch 22 is disconnected for reduction. In this case, the movable swash plate 55 of the hydraulic pump 51 may be rotated to the neutral position and kept at this state so as to be unable to run.

In this case, for notifying that obstacle or extraordinariness occurs on the vehicle speed detection means 116 and vehicle speed is limited, the control means 110 actuates the warning means 119 so as to warn by turning on, or on and off, the lamp or the like.

On the other hand, in the case that the sub transmission 80 is at the low speed position, regardless of the change of the speed change position of the HST 50, that is, slant angle of the movable swash plate 55 of the hydraulic pump 51 by operating the main shift lever, the vehicle speed is smaller than the set speed as shown in FIG. 6, whereby the control of the movable swash plate 55 by the control means 110 for prevention of the overspeed is not performed.

When the low speed position is selected, the maximum speed is smaller than the set speed, and rotation speed of the pump input shaft 23 rotated by the rear wheel 7 is not so large that the hydraulic pump 51 or the like is damaged, whereby the control of the movable swash plate 55 by the control means 110 is not performed.

Accordingly, the movable swash plate 55 of the hydraulic pump 51 is rotatable corresponding to the operation of the main shift lever when the slant angle of the movable swash plate 55 is smaller than the predetermined angle (step S9).

Even if the case is that the sub transmission 80 is at the high speed position, depending on the speed change position of the HST 50, the maximum speed may not be more than the set speed. With regard to the control of the movable swash plate 55 in this case, similar to the case that the sub transmission 80 is at the low speed position, the control of the movable swash plate 55 by the control means 110 for prevention of the overspeed is not performed so as to improve the operability of the working vehicle.

In the case that the vehicle speed detection means 116 does not detect the vehicle speed and the movable swash plate of the hydraulic pump 51 is controlled, the vehicle speed may be increased suddenly even if the vehicle speed is detected again. Then, the control of the movable swash plate 55 may be continued until a key switch is once turned off, for example, so as to limit the vehicle speed to be less than the set speed.

As mentioned above, the working vehicle, which has the HST 50 having the hydraulic pump 51 and the hydraulic motor 52, comprises:

the main clutch 22 disposed between the HST 50 and the engine 8;

the power transmission means disposed between the HST 50 and the rear wheel 7;

the hydraulic cylinder (actuator) 56 changing slant angle of the movable swash plate 55 of the hydraulic pump 51 of the HST 50; and the control means 110 controlling actuation of the hydraulic cylinder 56, wherein the main clutch connection/disconnection detection means 112 detecting the connection status of the main clutch 22 and the vehicle speed detection means 116 detecting the vehicle speed are provided, each of the detection means 112 and 116 is connected to the control means 110, when the vehicle speed is not less than the set speed at the time of disconnecting the main clutch 22, the slant angle of the movable swash plate 55 of the hydraulic pump 51 is held at the angle at which the main clutch 22 is disconnected.

Accordingly, when the main clutch 22 is disconnected for the reduction or the like at the time of high speed running, overspeed of the movable swash plate 55 of the hydraulic pump 51, the pump input shaft 23, and furthermore the clutch disc of the main clutch 22 is prevented. Therefore, these members and members around them are prevented from being damaged, whereby the safety is secured and the durability of the HST 50 is improved. Even if the main clutch 22 is switched from the disconnection state to the connection state, the movable swash plate 55 of the hydraulic pump 51 is not at the neutral position, whereby the sudden braking is prevented.

With regard to the working vehicle, when the vehicle speed is less than set speed at the time that the main clutch 22 is disconnected, the movable swash plate 55 of the hydraulic pump 51 is rotated to the neutral position. Accordingly, when the vehicle speed is not more than set speed, the movable swash plate 55 of the hydraulic pump 51 can be returned to the neutral position without causing the overspeed of the movable swash plate 55 of the hydraulic pump 51, the pump input shaft 23, and furthermore the clutch disc of the main clutch. Therefore, the sudden start at the time of connecting the main clutch 22 is prevented.

With regard to the working vehicle, when the vehicle speed detection means 116 does not detect the vehicle speed, the slant angle of the movable swash plate 55 of the hydraulic pump 51 is controlled so that the vehicle speed is smaller than the set speed. Accordingly, the vehicle speed is limited to be smaller than the set speed. Even if the vehicle speed is not detected because of the obstacle of the vehicle speed detection means 116 or the like, the overspeed of the hydraulic pump 51, the pump input shaft thereof, and furthermore the clutch disc of the main clutch 22 is certainly prevented. Moreover, even if the vehicle is stopped compulsorily in the field, a footing for an operator can be secured and moving work such as tillage can be continued.

With regard to the working vehicle, the sub transmission 80 is provided, and in the case that the vehicle speed detection means 116 does not detect the vehicle speed, when the sub transmission 80 is at the low speed position, the slant angle of the movable swash plate 55 of the hydraulic pump 51 can be changed suitably. Accordingly, the running at the vehicle speed lower than the set speed can be performed while the speed change is performed with the HST 50, whereby the running or work can be continued.

With regard to the working vehicle, the rotation detection means 116a, which outputs a pulse signal corresponding to the rotation of the sub speed change shaft 84 serving as a drive shaft of the rear wheel 7, and the F/V conversion means 116b, which outputs the voltage corresponding to the frequency of the pulse signal of the rotation detection means 116a are provided. Accordingly, compared with the case that the vehicle speed detection means 116 only has the rotation detection means 116a, the obstacle or extraordinariness of the vehicle speed detection means 116 can be detected easily.

With regard to the working vehicle, the warning means 119 which warns when the vehicle speed is not detected by the vehicle speed detection means 116 is provided. Accordingly, an operator's attention is called to the obstacle or extraordinariness of the vehicle speed detection means 116 so as to recognize the limit of the vehicle speed.

Furthermore, with regard to the working vehicle with the HST 50, the smooth acceleration or deceleration operation can be performed easily with the main shift lever and the sub shift lever.

An explanation will be given on the running control (speed change control) of the working vehicle (running vehicle).

As shown in FIG. 4, the working vehicle has a low speed setting apparatus 155 setting minimum vehicle speed FLP1Vmin and a speed change ratio pattern at the minimum speed position of the main shift lever corresponding to the low speed (first gear) position of the sub shift lever, a middle speed setting apparatus 156 setting minimum vehicle speed FLP2Vmin and a speed change ratio pattern at the minimum speed position of the main shift lever corresponding to the middle speed (second gear) position of the sub shift lever, and a high speed setting apparatus 157 setting minimum vehicle speed FLP3Vmin and a speed change ratio pattern at the minimum speed position of the main shift lever corresponding to the high speed (third gear) position of the sub shift lever. In addition to the above-mentioned detection means, these setting apparatuses are connected to the control means 110. Each of the setting apparatuses 155, 156 and 157 is formed by a variable resistor so that each of the minimum vehicle speed FLP1Vmin, FLP2Vmin and FLP3Vmin at the minimum speed position of the main shift lever can be changed steplessly.

Based on outputs of the main shift lever detection means 114, the sub shift lever detection means 115, the low speed setting apparatus 155, the middle speed setting apparatus 156 and the high speed setting apparatus 157, the electromagnetic valve 118 actuates the hydraulic cylinder 56 so as to control the slant angle of the movable swash plate 55 of the hydraulic pump 51 of the HST 50, thereby changing the main speed change ratio of the HST 50. For operating the sub shift lever corresponding to the working conditions so as to set the minimum vehicle speed and the speed change ratio pattern for each speed change stage of the sub transmission 80, the low speed setting apparatus 155, the middle speed setting apparatus 156 and the high speed setting apparatus 157 are respectively provided. However, one setting apparatus may alternatively serve as the setting apparatuses 155, 156 and 157, or each of the setting apparatuses 155, 156 and 157 may alternatively be formed to be semifixed structure which is set initially by maintenance work by a maintainer.

Next, an explanation will be given on the adaptive control of main speed change ratio of the HST 50. Herein, the ratio of rotation speed of the main speed change output shaft of the HST 50, that is, the ratio of the motor output shaft 54 to the engine rotation speed is referred to as the main speed change ratio. The control making the vehicle speed close to or in agreement with the target vehicle speed corresponding to the operation position of the main shift lever and the operation position of the sub shift lever is referred to as speed change ratio adaptive control. In other words, the electromagnetic valve 118 controlling the speed change ratio of the HST 50 is controlled so as to make vehicle speed correspond to the operation position of the main shift lever and the operation position of the sub shift lever to be the target vehicle speed. Then, the speed change ratio pattern of rotation speed of the motor output shaft 54 of the HST 50 with respect to the operation position of the main shift lever and the operation position of the sub shift lever is stored in a RAM (random access memory) as a pattern storage means of the control means 110.

Figure 7:
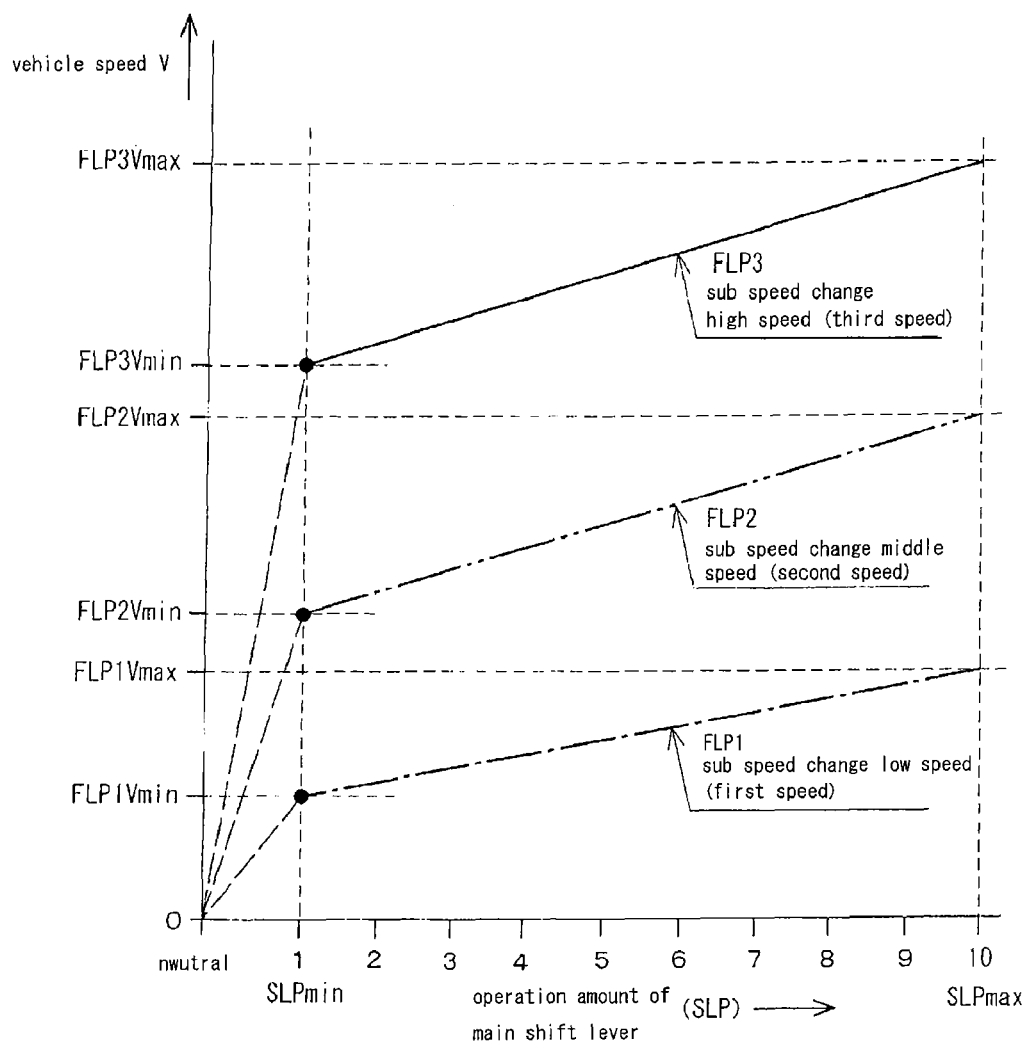
FIG. 7 It is a diagram of relation between main transmission output and vehicle speed.

With regard to the speed change ratio pattern, the traveling speed increases in proportion to the increase of operation amount of the main shift lever, and the proportional function thereof is linear. The proportional function of the speed change ratio pattern may alternatively be quadratic. A plurality of speed change ratio patterns is stored in the pattern storage means in the form of a function table or a map (see the speed change ratio diagram shown in FIG. 7). In the embodiment of FIG. 7, corresponding to the operation of three stages, the low speed (first gear) position, the middle speed (second gear) position and the high speed (third gear) position of the sub shift lever, three types of speed change ratio patterns are provided and stored previously in the pattern storage means. When the sub shift lever is operated, one of the three speed change ratio patterns is selected (indicated) corresponding to the sub speed change operation position. In other words, the sub shift lever is a member for changing the rate of change of the main speed change ratio corresponding to the operation amount of the main shift lever.

In the embodiment of FIG. 7, the axis of abscissas indicates the main speed change ratio P (the operation amount of the main shift lever) and the axis of ordinates (see the left axis of ordinates) indicates the vehicle speed V (the rotation speed of the sub speed change shaft 84) so as to show a diagram of the speed change ratio pattern. The lines in FIG. 7 are sub speed change low speed (first) output FLP1, sub speed change middle speed (second) output FLP2 and sub speed change high speed (third) output FLP3 in upward order. With regard to the slant angle of the movable swash plate 55 of the hydraulic pump 51 of the HST 50, there is set the rotation range from the neutral position at which the rotation speed of the motor output shaft 54 is substantially zero to the maximum slant angle (maximum vehicle speed), that is, the speed change range of the HST 50 from the minimum vehicle speed to the maximum vehicle speed (the range of SLP from 1=SLPmin to 10=SLPmax) is set. In the main speed change range of the HST 50 (1=SLPmin to 10=SLPmax), the minimum rotation speed of the hydraulic motor 52 of the HST 50 is maintained so that vehicle speed V corresponding to the minimum vehicle speed (1=SLPmin) is in agreement with one of the minimum vehicle speed FLP1Vmin of the low speed output FLP1, the minimum vehicle speed FLP2Vmin of the middle speed output FLP2 and the minimum vehicle speed FLP3Vmin of the high speed output FLP3 of the sub speed change.

When the sub shift lever is operated to the low speed (first gear) position, by operating the main shift lever to the minimum vehicle speed (1=SLPmin), the slant angle of the movable swash plate 55 of the hydraulic pump 51 is controlled so that the vehicle speed V becomes the minimum vehicle speed FLP1Vmin necessary for maintaining the minimum rotation speed of the hydraulic motor 52. In other words, minimum vehicle speed FLP1Vmin and FLP2Vmin of the sub speed change output in the case that the main shift lever is operated to the position of the minimum vehicle speed 1=SLPmin at the side of high speed stages FLP2 and FLP3 at which the speed change ratio of the sub transmission 80 is low is higher than maximum vehicle speed FLP1Vmax and FLP2Vmax of the sub speed change output in the case that the main shift lever is operated to the position of the maximum vehicle speed 10=SLPmax at the side of low speed stages FLP1 and FLP2 at which the speed change ratio of the sub transmission 80 is high. As a result, by super-low speed (the minimum vehicle speed 1=SLPmin) operation of the main shift lever, the HST 50 stalls (the rotation speed of the hydraulic motor 52 is kept at zero though the slant angle of the movable swash plate 55 of the hydraulic pump 51 is increased to be larger than the neutral) so as to prevent the working vehicle from stopping.

For example, conventionally, in agricultural work or the like, in the case that the state in which the HST 50 stalls by super-low speed (the minimum vehicle speed 1=SLPmin) operation of the main shift lever is mistaken for the state in which the working vehicle stops by neutral operation of the main shift lever by misjudgment of an operator, when the stall of the HST 50 is released by decrease of load on the engine 8 or the like, the working vehicle moves at super-low vehicle speed against the intention of an operator. However, in this embodiment, the super-low speed operation of the main shift lever can be performed while preventing the stall of the HST 50.

On the other hand, when the sub shift lever is operated to the middle speed (second gear) position or the high speed (third gear) position, by operating the main shift lever to the minimum vehicle speed (1=SLPmin), the slant angle of the movable swash plate 55 of the hydraulic pump 51 is controlled so that the vehicle speed V becomes the minimum vehicle speed FLP2Vmin and FLP3Vmin necessary for maintaining the minimum rotation speed of the hydraulic motor 52. As a result, regardless of the speed change position of the sub shift lever, the vehicle speed becomes zero by neutral operation of the main shift lever. However, in this embodiment, the minimum vehicle speed FLP2Vmin of the sub speed change middle speed (second gear output) is set to be larger than the maximum vehicle speed FLP1Vmax of the sub speed change low speed (first gear output), and the minimum vehicle speed FLP3Vmin of the sub speed change high speed (third gear output) is set to be larger than the maximum vehicle speed FLP2Vmax of the sub speed change middle speed (second gear output), whereby the overlapping of the vehicle speed V by operation of the main shift lever is prevented at each speed change stage of the sub shift lever.

Regardless of switching operation of the speed change stage of the sub shift lever, the vehicle speed V is increased or decreased linearly by operation of the main shift lever within the large speed change range from the sub speed change low speed to the sub speed change high speed. Accordingly, an operator can perform the speed change with the main shift lever between the sub speed change low speed and the sub speed change high speed while estimating the change of moving speed easily, whereby the vehicle speed V can be easily changed to be suitable for conditions of agricultural work or the like so as to improve the efficiency of the agricultural work or the like.

Similar to the case that the sub shift lever is operated to the low speed (first gear) position, in the case that the sub shift lever is operated to the middle speed (second gear) position or the high speed (third gear) position, the working vehicle is also prevented from stopping by the stall of the HST 50 by the super-low speed (the minimum vehicle speed 1=SLPmin) operation of the main shift lever. Accordingly, with regard to the transmission structure having the HST 50, smooth speed change of running power can be performed smoothly similar to the conventional gear transmission structure having a main speed change gear instead of the HST 50.

Figure 8:
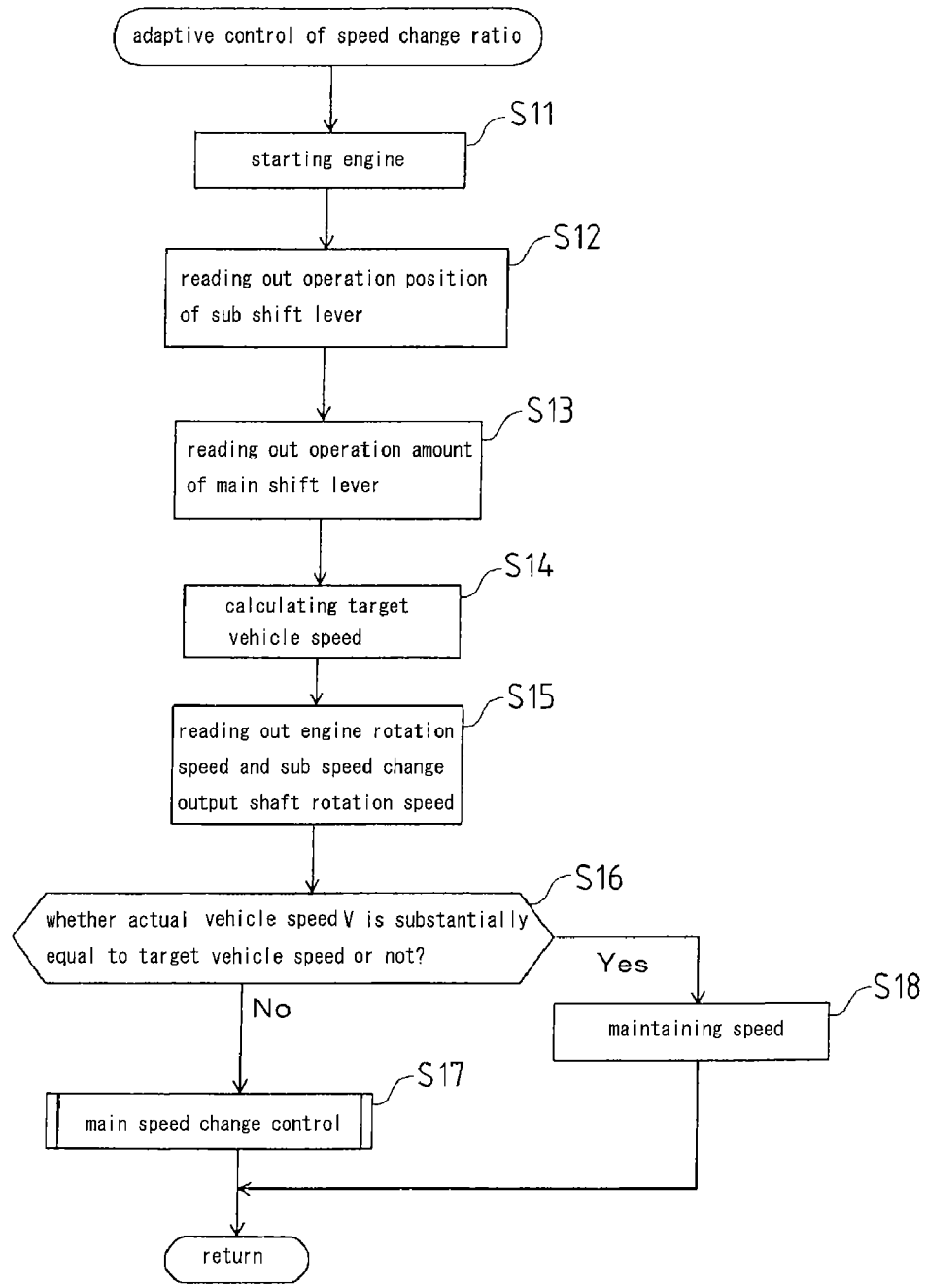
FIG. 8 It is a flow chart of speed change ratio adaptive control.

Next, an explanation will be given on the mode of the adaptive control of main speed change ratio referring to a flow chart of speed change ratio control (FIG. 8). As mentioned above, the electromagnetic valve 118 is actuated proportionally to the operation amount of the main shift lever and pressure oil from the valve actuates the hydraulic cylinder 56 so as to control discharge amount of pressure oil of the hydraulic pump 51 of the HST 50 which is the main transmission. In this case, automatic control is performed so as to maintain the minimum vehicle speed FLP1Vmin, FLP2Vmin and FLP3Vmin respectively set with the setting apparatuses 155, 156 and 157. In more detail, operation amount of the main shift lever and operation position of the sub shift lever are self-monitored, and the minimum vehicle speed FLP1Vmin, FLP2Vmin and FLP3Vmin respectively set with the setting apparatuses 155, 156 and 157 are automatically controlled to be maintained corresponding to change of the operation amount of the main shift lever and the operation position of the sub shift lever. Accordingly, the rotation speed of the motor output shaft 54 can be changed and adjusted steplessly.

Consequently, with regard to the adaptive control of speed change ratio, the engine is started (step S11), and subsequently the operation position of the sub shift lever is read out (step S12), and the predetermined speed change ratio patterns stored in the RAM (random access memory) of the control means 110 are read out.

Next, for making the working vehicle run forward (rearward), the main shift lever is operated so that the operation amount of the main shift lever is read out from the main shift lever detection means 114 to the control means 110 (step S13). Based on the read value, a calculation part of the control means 110 calculates target vehicle speed (target speed change ratio) corresponding to the operation amount of the main shift lever on the selected speed change ratio patterns FLP1, FLP2 and FLP3 (step S14).

On the other hand, with regard to the control means 110, engine rotation speed is read out from the engine rotation speed detection means 111 at fixed time intervals (sampling time intervals) regularly at the time of running, and the vehicle speed detection means 116 detects and reads out the rotation speed of the sub speed change shaft 84 (step S15). The vehicle speed V is calculated from the ratio of the rotation speed of the sub speed change shaft 84 (numerator) to the engine rotation speed at the sampling time (the present time) (denominator), and whether the actual vehicle speed V is substantially equal to the target vehicle speed on the selected speed change ratio patterns FLP1, FLP2 and FLP3 or not is judged (step S16).

When the actual vehicle speed V (actual speed change ratio) is different from the target vehicle speed (target speed change ratio) by not less than predetermined percentage, the main speed change operation is performed so that the control means 110 corrects applied voltage of the electromagnetic valve 118 so as to change and adjust the slant angle of the movable swash plate 55 of the hydraulic pump 51, whereby discharge amount of pressure oil to the hydraulic motor 52 is controlled so as to increase or decrease the rotation speed of the motor output shaft 54 (step S17). When the actual vehicle speed V is substantially equal to the target vehicle speed (the actual vehicle speed V is within the predetermined percentage against the target vehicle speed), the rotation speed of the motor output shaft 54 is maintained (step S18).

Then, in the case that the sub shift lever is operated to the middle speed (second gear) position or the high speed (third gear) position, by operating the main shift lever to the minimum vehicle speed (1=SLPmin), the slant angle of the movable swash plate 55 of the hydraulic pump 51 is controlled so that the vehicle speed V becomes the minimum vehicle speeds FLP1Vmin, FLP2Vmin and FLP3Vmin necessary for maintaining the minimum rotation speed of the hydraulic motor 52. As a result, regardless of the speed change position of the sub shift lever, the vehicle speed becomes zero by neutral operation of the main shift lever. However, the minimum vehicle speed FLP1Vmin, FLP2Vmin and FLP3Vmin are maintained by operating the main shift lever, whereby the overlapping of the vehicle speed V by operation of the main shift lever is prevented at each speed change stage of the sub shift lever. Also, the stall of the HST 50 (generation of the overload driving state in which the rotation speed of the hydraulic motor 52 has been stopped though the slant angle of the movable swash plate 55 of the hydraulic pump 51 is increased to be larger than the neutral) caused by super-low speed (the minimum vehicle speed 1=SLPmin) operation of the main shift lever is prevented.

Accordingly, with regard to the running device of the working vehicle with the HST 50 changing the power from the engine to speed, the main shift lever as the main speed change operation means changes the speed change ratio of the HST 50, the multi-stage type sub transmission 80 transmits speed-changed driving output from the HST 50, and the sub shift lever as the sub speed change operation means changes the speed change ratio of the sub transmission 80.

The running device has:

the main shift lever detection means 114 detecting the operation position of the main shift lever;

the vehicle speed detection means 116 as a speed change output part rotation detection means detecting speed change driving output rotation speed of the HST 50; and the sub shift lever detection means 115 detecting the operation position of the sub shift lever, wherein the minimum main speed change output FLP1Vmin, FLP2Vmin and FLP3Vmin from the HST 50 determined by the operation of the main shift lever is changed by the operation of the sub shift lever.

Accordingly, the overlapping of the vehicle speed FLPV1 is prevented at a plurality of speed change stages FLP1, FLP2 and FLP3. As a result, when the speed change stage FLP1 or FLP2 of the sub transmission 80 is changed to the high speed side, the vehicle speed selected by the main shift lever does not become lower than that of before changing the speed change stage FLP1 or FLP2 of the sub transmission 80. On the other hand, when the speed change stage FLP2 or FLP3 of the sub transmission 80 is changed to the low speed side, the vehicle speed selected by the main shift lever does not become higher than that of before changing the speed change stage FLP2 or FLP3 of the sub transmission 80. Therefore, similar to the conventional gear transmission not having the hydraulic pump 51 and the hydraulic motor 52 for speed change (the construction in which each of main and sub speed change mechanisms has a plurality of gears), smooth acceleration and deceleration operation can be performed easily with the main shift lever and the sub shift lever.

At the time of running on the load at which the vehicle moves at high speed, when the main shift lever is operated to the low speed side, the power from the engine 8 is prevented from being not transmitted to the rear wheels 7 as a running part before the main shift lever shifts to the neutral position. Accordingly, at the time of running on the load, the running vehicle is easily prevented from stopping or running oppositely on a slope though the engine is actuated and the main shift lever is operated to the speed change position.

It is constructed so that the minimum vehicle speed FLP2Vmin and FLP3Vmin at the time that the speed change ratio of the sub transmission 80 is at the side of high speed stages FLP2 and FLP3 is higher than the maximum vehicle speed FLP1Vmax and FLP2Vmax at the time that the speed change ratio of the sub transmission 80 is at the side of low speed stages FLP1 and FLP2. Accordingly, the overlapping of the vehicle speed FLPV1 is prevented at a plurality of speed change stages FLP1, FLP2 and FLP3. When the speed change stage of the sub transmission 80 is changed to the high speed side FLP2 or FLP3 (the low speed side FLP1 or FLP2), the vehicle speed selected by the main shift lever is prevented from being lower (higher) than that of before changing the speed change stage. Smooth acceleration and deceleration operation can be performed easily with the main shift lever and the sub shift lever.

There are provided the control means 110 as the pattern storage means in which a plurality of the speed change ratio patterns of the HST 50 is stored, and the low speed setting apparatus 155, the middle speed setting apparatus 156 and the high speed setting apparatus 157 as the pattern setting apparatus selecting the speed change ratio pattern of the HST 50. Corresponding to the operation amount of the main shift lever, the output rotation speed of the HST 50 is controlled based on the speed change ratio pattern selected by the setting apparatuses 155, 156 and 157. Accordingly, after setting the speed change ratio pattern by the setting apparatuses 155, 156 and 157, when the actual speed change ratio is shifted from the target value by change of the environment, variation of running load of the working vehicle or the like, the speed change ratio is automatically controlled to be close to the target speed change ratio only by operating the main shift lever.

INDUSTRIAL APPLICABILITY

The working vehicle with the HST according to the present invention can prevent an over-speed condition of the hydraulic pump of the HST, the pump input shaft thereof or the like when the main clutch is disconnected, whereby the present invention is industrially useful.

The invention claimed is:

1. A working vehicle with a hydraulic stepless transmission (HST) having a hydraulic pump and a hydraulic motor, comprising:

a main clutch disposed between the HST and an engine;

a power transmission means disposed between the HST and a wheel;

an actuator changing slant angle of a movable swash plate of the hydraulic pump of the HST; and a control means controlling actuation of the actuator, wherein:

a main clutch connection/disconnection detection means detecting connection status of the main clutch and a vehicle speed detection means detecting vehicle speed are provided, the main clutch connection/disconnection detection means and the vehicle speed detection means are connected to the control means, when the vehicle speed detected by the vehicle speed detection means is not less than a set speed at a time of disconnecting the main clutch, the slant angle of the movable swash plate of the hydraulic pump is held at an angle at which the main clutch is disconnected, and when the vehicle speed detection means does not detect the vehicle speed, a slant angle of the movable swash plate of the hydraulic pump is controlled so that vehicle speed is smaller than the set speed.

2. The working vehicle with the HST as set forth in claim 1, wherein when the vehicle speed detected by the vehicle speed detection means is less than the set speed while the main clutch is disconnected, the movable swash plate of the hydraulic pump is rotated to a neutral position.

3. The working vehicle with the HST as set forth in claim 2, wherein the vehicle speed detection means comprises a rotation detection means, which outputs a pulse signal corresponding to rotation of a drive shaft of the wheel, and a conversion means, which outputs a voltage corresponding to a frequency of the pulse signal of the rotation detection means.

4. The working vehicle with the HST as set forth in claim 2, further comprising a warning means which warns when vehicle speed is not detected by the vehicle speed detection means.

5. The working vehicle with the HST as set forth in claim 1, wherein a sub transmission is provided in the power transmission means, and in a case that the vehicle speed detection means does not detect the vehicle speed, when the sub transmission is at a low speed position, the slant angle of the movable swash plate of the hydraulic pump can be changed suitably.

6. The working vehicle with the HST as set forth in claim 5, wherein the vehicle speed detection means comprises a rotation detection means, which outputs a pulse signal corresponding to rotation of a drive shaft of the wheel, and a conversion means, which outputs a voltage corresponding to a frequency of the pulse signal of the rotation detection means.

7. The working vehicle with the HST as set forth in claim 5, further comprising a warning means which warns when vehicle speed is not detected by the vehicle speed detection means.

8. The working vehicle with the HST as set forth claim 1, wherein the vehicle speed detection means comprises a rotation detection means, which outputs a pulse signal corresponding to rotation of a drive shaft of the wheel, and a conversion means, which outputs a voltage corresponding to a frequency of the pulse signal of the rotation detection means.

9. The working vehicle with the HST as set forth in claim 1, further comprising a warning means which warns when vehicle speed is not detected by the vehicle speed detection means.

* * * * *